United States Patent [19]

Delaney et al.

[11] Patent Number: 4,787,082
[45] Date of Patent: Nov. 22, 1988

[54] DATA FLOW CONTROL ARRANGEMENT FOR LOCAL AREA NETWORK

[75] Inventors: Robert H. Delaney, Blairstown; Alexander G. Fraser, Bernardsville; Charles R. Kalmanek, Jr., Hoboken; Robert C. Restrick, III, Hopatcong, all of N.J.

[73] Assignee: American Telephone and Telegraph Company, AT&T Bell Laboratories, Murray Hill, N.J.

[21] Appl. No.: 890,262

[22] Filed: Jul. 24, 1986

[51] Int. Cl.$^4$ ............................................. H04J 3/02
[52] U.S. Cl. ..................................... 370/85; 370/94
[58] Field of Search ............... 370/85, 94; 340/825.5, 340/825.51

[56] References Cited

U.S. PATENT DOCUMENTS

| 3,796,992 | 3/1974 | Nakamura et al. | 340/147 |
| 3,818,447 | 6/1974 | Craft | 340/147 |
| 4,516,205 | 7/1985 | Eing et al. | 364/200 |
| 4,538,262 | 8/1985 | Sinniger et al. | 370/85 |
| 4,670,872 | 6/1987 | Cordill | 370/85 |

FOREIGN PATENT DOCUMENTS

| 0231952 | 12/1984 | Japan | 370/85 |
| 2162722 | 2/1986 | United Kingdom | 370/85 |

*Primary Examiner*—Douglas W. Olms
*Assistant Examiner*—Min Jung
*Attorney, Agent, or Firm*—Alfred G. Steinmetz

[57] ABSTRACT

In a local data distribution network configuration a plurality of bidirectional data distribution busses are each connected to a bus master control circuit at a terminal end of the bus. Connected to each of the data distribution busses are a plurality of passive outlets to which intelligent connectors or stations may be connected. Each station has a unique address and is utilized for individually coupling data processing devices to the bus. Grouped pluralities of the bus master control circuits are included within a bus termination hub facility. Data from any of the bus master control circuits may be transferred by the bus termination hub via a data trunk as part of a star type configuration, to a central switching circuit such as a virtual circuit switch. Direction of data flow on each of the bidirectional busses and periodic temporary synchronization of the stations is controlled in response to signals transmitted to the bus by the bus master control circuitry associated with that bus. A bus termination hub switching facility cooperates with the included group of bus master control circuits to interconnect data processing stations on the various busses with the virtual circuit switch via the trunk line and with each other.

The bus termination hub facility further includes bus monitoring, status polling and maintenance facilities. A faulty bus will be disconnected if a fault is discovered during monitoring intervals. It will remain disconnected until the fault is corrected.

27 Claims, 5 Drawing Sheets

DATA FLOW CONTROL ARRANGEMENT FOR LOCAL AREA NETWORK

FIELD OF THE INVENTION

This invention relates to a local data disribution system and its control system, and more particularly to a distribution architecture using centralized and local virtual circuit switches to interconnect a plurality of data distribution busses each of which is designed to allow shared or multiplexed access to a plurality of data stations or devices. It is also related to a packet switching node with a control of data flow arrangement for interconnecting a plurality of independent data distribution busses to a data network.

BACKGROUND OF THE INVENTION

With the recent expansion in the use of computers and computer terminals it is not unusual to have a large number of computers and terminals within a limited local area. It is very desirable to couple these units together to allow sharing of resources and provide the ability to permit a single terminal to access a plurality of other terminals and computers. The medium alowing these features is a local area network system which provides switching and data distribution for a communication medium specifically tailored or local area transmission distances and which allows computers to communicate with each other and further allows any single terminal to have access to a multiplicity of computers and peripheral equipment.

An important aspect of any local area data distribution system is its network topology or interconnection scheme between data processing devices and network nodes. These topology aspects are important since the particular topology selected impacts the administration, complexity and overall cost of constructing and operating the system. A local area data distribution network may conceivably assume many interconnection topologies which may range from complex arbitrary topologies to more basic structured topologies. The basic structured topologies are normally constrained to certain basic types in order to limit the control complexity of the network nodes with the most common basic types being the star, the ring, and the bus transmission system topologies.

In a star network topology each data processing device is connected to a common central switching node which is operative for interconnecting the data processing stations to each other or to a gateway coupling it to a wide area network comprising a plurality of local data distribution networks and computers. The predominant wiring pattern is from point to point, that is, from a plurality of individual data processing devices to a central host switching node. The star network topology has the advantage of providing superior privacy since each subscriber line is dedicated, and good security, since the control switch node may be securely housed and is centrally controlled, the network is centrally maintained and it also provides high reliability.

The ring and bus network topologies are distributed type topologies and eliminate the central switching node that is the heart of the star network topology. Hence, these topologies include some of the control functions within each of the data processing devices connected thereto. Network maintenance is normally more difficult than in the star topology because of the distributed nature of the network.

In the ring network topology, transmission is from node to node around a closed loop and each node may alter the dat passing therethrough. Each data processing device is connected to a separate node and intercepts only data messages specifically directed to it. Since the data flows through each node and since the nodes are distributed, no central node may be separately secured and hence, the security and privacy of a ring network topology is somewhat less than that of the star network topology. Since all nodes are in one closed loop, failure of a single node may render the whole ring network inoperative. The closed loop topology also limits flexibility in some arrangements where adding new nodes or data processing stations may result in the loss of data.

Data transmission in a bus network topology is typically broadcast from one source to all other devices on the same bus but normally only accepted by the device to which it is specifically addressed. Individual data processing devices are programmed to recognize data messages addressed to or intended for them as they pass by on the bus. The reliability of the bus network topology in terms of network node failure is greater than that of the ring network topology although a break in the bus may be catastrophic. There is also greater flexibility in adding new data processing devices to the system than is normally possible with the star topology since no wiring reconfiguration is required.

Yet another data distribution topology, currently being used is the petal arrangement or star ring hybrid arrangement in which the ring data transmission bus assumes a star like configuration. Each individual data station is located on a separate petal in which the data transmission path starts from and returns to a relay switch located at a central control node while passing through a data station located in the petal. The relay switch is utilized to short and thereby disconnect any petal containing a faulty station from the ring network and thereby maintain the continuity at operation of the remaining ring transmission path. The control of data flow arrangement is essentially the same as that of a conventional ring topology.

In some modifications of the above arrangement an individual petal may include more than one data station, however the petal transmission loop still remains part of the ring and the data flow is unidirectional in the petal's outgoing and incoming transmission paths in agreement with the direction of data flow in the ring network. In both arrangements the performance achieved and privacy considerations are similar to those of the basic ring data distribution topology.

In still another data distribution topology, star configured wiring is utilized with a functional OR type logic gating bus arrangement in which a plurality of data stations are coupled to an OR-gating bus. The OR-gating bus is in turn coupled to a bridging hub which joins a number of such OR-gating busses into a bus structured network. In this arrangement each station seeking permission to transmit data looks for the presence of another transmitting station on the ORing bus arrangement before proceeding to transmit data. A major disadvantage of this arrangement is that signal propagation delays may allow several stations to assume data transmission permission with resulting data collisions of data from two or more stations. The bridging hub also does not provide any control of data flow. Furthermore, while the wiring scheme perts flexibility of system arrangements, there is no centralized maintenance.

It is apparent from the foregoing that each of the above described network topologies has its own advantages and disadvantages, and that the characteristics concerning privacy, security and reliability are different for each network topology. Each topology has its own requirements concerning network administration and maintenance. In many cases however the aforedescribed networks require active administration in adding and or deleting users and in many instances uniform software is required for all the connected data processing devices.

It is desirable to have a data distribution system that has the central control and maintenance of a star topology network and the flexibility and distribution wiring of a bus network, which is inexpensive and that can accommodate changing needs and varied distribution schemes of an actively used and changing local data distribution network in which data processing devices and/or stations are frequently added or deleted. It is also desirable that the distribution scheme be sufficiently flexible to allow additions to and removal of various components of the system without the necessity of active maintenance of an administrator. Any such distribution scheme must also take into account the desirability of hardware security, data privacy and ease of administration. A further consideration is whether a building must be rewired to install a local data distribution network as opposed to using existing wiring in the building.

BRIEF SUMMARY OF THE INVENTION

In a local data distribution network configuration embodying the principles of the invention, a centralized star like data distribution system having centralized data switching has a plurality of bus type data distribution systems connected to its various radial connections. Each bus type data distribution system has localized data switching and a plurality of data distribution busses which are operated through a common maintenance facility which controls local data switching on the data distribution busses. In particular a plurality of bidirectional data distribution busses are each connected to a bus master control circuit at a terminal end of the bus. Connected to each of the data distribution busses are a plurality of passive outlets to which intelligent connectors or stations may be connected. Each station has a unique address and is utilized for individually coupling data processing devices to the bus. Grouped pluralities of the bus master control circuits are included within a bus termination hub facility. Data from any of the bus master control circuits may be transferred by the bus termination hub using virtual circuit switching techniques via a data trunk as part of a star type configuration, to a central switching circuit. The central switching circuit connects a plurality of bus termination hub facilities and other computing entities and also operates by virtual circuit switching techniques. Direction of data flow on each of the bidirectional busses and periodic temporary synchronization of the stations is controlled in response to signals transmitted to the bus by the bus master control circuitry associated with that bus. A bus termination hub switching facility cooperates with the included group of bus master control circuits to interconnect data processing stations on the various busses with the central switching circuit via a trunk line or with each other.

The station or intelligent connector is an active tap connecting a data processing device to the bus and includes a bus interface and data processing device interface circuit. This device interface circuit is specific to the type of data processing device it is connected to and is operative to perform a protocol conversion between the device and the bus. The bus interface is identical in design for all stations and is operative to put data on and take data off the bus. Each station actively helps to maintain privacy in the system since it can only receive data specifically addressed to it. It further provides improved reliability and superior ease of adnistration since the bus termination hub is designed to function as a maintenance point for the distribution system Groups of bus master control circuits are each located in an associated bus termination hub which includes a virtual circuit switch to interconnect the various bus master control circuits to a centralized data switch or to each other. The bus termination hub functions as a local packet switch interconnecting data processing devices to each other on data distribution busses or to the central circuit switch. The central circuit switch is a remote virtual circuit switch as opposed to the local virtual circuit switch of the bus termination hub facility. The bus master control circuits function to additionally control direction of data flow on its associated bus and also provide a synchronizing start signal to initiate data packet transfers both to and from the individual stations.

Data flow within the data distribution network is in a data packet format. Each packet includes a header, message and framing portion. The header includes synchronizing information, directional data flow information, and an address field. During certain operational states of the system, the header also includes polling commands, and the message includes status information. These polling commands and status and synchronizing information permit controlled maintenance of the data distribution busses connected to a bus termination hub. The message part may also include an error check code. The exact nature and content of a packet is dependent upon its source of origin, be it for polling, for receiving information or for transmitting data. Advantages of the aforedescribed arrangement include a bus wiring plan that allows great flexibility in adding and deleting data processing devices while limiting the size of groups that can communally fail and while maintaining a reasonable level of privacy of information and security of the intended data destination.

A further aspect of this arrangement is that once contention between competing stations is resolved the individual station that will subsequently transmit data to the bus termination hub applies a synchronization pulse to the wire to synchronize the bus termination hub: it may then transmit data at a faster clock rate than the rate of data flow on the bus during contention between competing stations.

A suitable virtual circuit switch for a local data distribution network embodying the principles of the invention has been priorly disclosed by one of us, A. G. Fraser, in U.S. Pat. No. 3,749,845, issued July 31, 1973, and as disclosed, is applicable to various local data distribution network topologies. It is particularly suitable to star network topologies and as such operates to create a virtual circuit between two distinct data processing units connected to the star's common central node or controller. This connection being virtual, is really a temporary connection at any one time which appears to be a dedicated circuit connection to the two data processing stations in communication with one another.

BRIEF DESCRIPTION OF THE DRAWINGS

An understanding of the invention may be readily attained by reference to the drawing and the following specification in wiich

DETAILED DESCRIPTION

Figure 1:
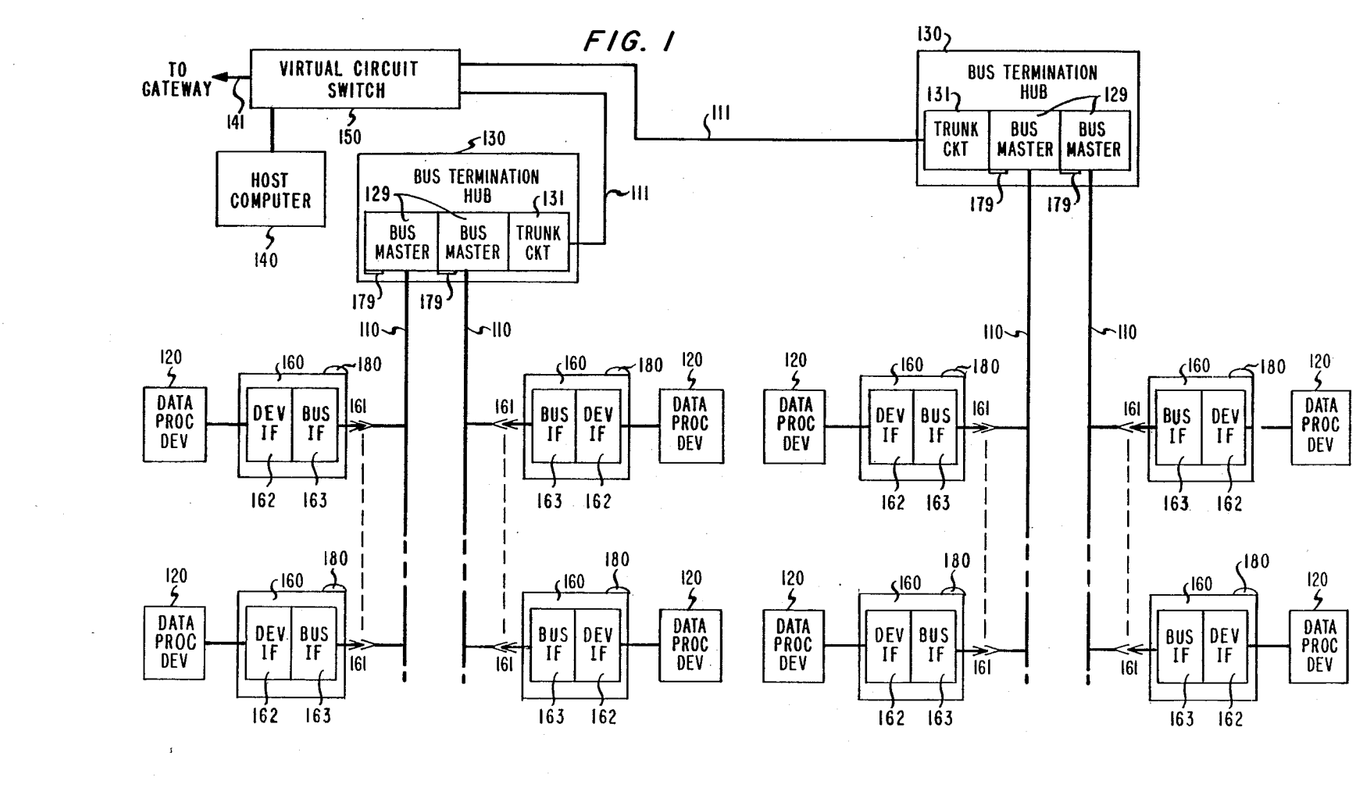
FIG. 1 is a block diagram of a local area data distribution network embodying the principles of the invention, FIGS. 2, 3 and 4 disclose schematics of various forms of packets utilized by the local area data distribution network of FIG. 1.

A block diagram of an illustrative bodiment of a local area data distribution network embodying the principles of the invention is disclosed in FIG. 1. A plurality of data transmission busses 110 are shown with an accompanying plurality of data processing devices 120 coupled to each data transmission bus 110. The data transmission busses 110 are each terminated at a bus master control circuit 129, which are in turn included in a bus termination hub 130. The bus termination hubs 130 each include a trunk circuit 131 which is in turn connected, via a data trunk 111, to a central virtual circuit switch 150. The bus termination hub and central circuit switch each includes a virtual circuit switch such as disclosed in the above mentioned U.S. Pat. No. 3,749,845 and each of which provides virtual circuit connecting links between data processing devices or to a host computer 140 or to a gateway trunk 141. Any one of the individual data processing devices 120 may communicate over the network system to a host computer 140, or via a trunk 141 to a gateway switch, or with any of the other data processing devices 120.

Each data processing device 120 is coupled to the bus 110 through an intelligent connector unit or station 160. Between the bus 110 and the intelligent connector unit 160 is a passive plug arrangement 161 which permits an intelligent connector unit 160 to be connected anywhere along a bus where there is an unengaged passive bus receptacle. The intelligent connector units or stations 160 each include a device interface unit 162 and a bus interface unit 163. The device interface unit 162 is specific to the particular type of device that it interconnects and includes a station identification code and type code so that a controlled maintenance unit may identify the data processing device. Both station units include data buffering capabilities.

Each bus 110 terminates at a bus master control circuit 129 which is included within a bus termination hub 130. The bus master control circuit 129 includes data memory for buffering of data between the switching circuitry on bus termination hub 130 and the bus 110. The bus termination hub 130 includes address translation circuitry operative as a virtual circuit switch for local data switching for destinations located on the busses connected to it, and to destinations in turn connected via a trunk circuit 131 and a data trunk 111 to the central virtual circuit switch 150 which establishes circuit patterns to direct data to desired remote destinations through software control. The data switching circuitry of the bus termination hub 130 operates as a local virtual circuit switch and permits and controls the interconnection of any one data processing device 120 to any other data processing device 120, whether it is connected on the same bus 110 or another bus 110 coupled to the same bus termination hub 130. It is also operative to connect any of its data processing devices to the central virtual circuit switch 150, whereby it is connected to other bus termination hubs and their associated data processing devices or to a major gateway.

Data transmission on a local area data distribution system such as shown in FIG. 1 typically comprises randomly scattered concentrated bursts of data. Hence, it is advantageous to transmit data in packet format. The specific format of data packets utilized by the local area data distribution network of FIG. 1 is disclosed in schematic form in FIGS. 2, 3, and 4. These data packets are designed to transmit message control and message destination information in addition to the message itself. The specific arrangement of a given data packet depends upon its intended use and direction at transmission; however all packets in the illustrative embodiment have common features. The data packets discussed in FIGS. 2, 3 and 4 all include a header portion, a message portion, an error check information to delineate the packet portion, and a fring portion, all in a definite sequence. The header portion of the packet includes a start bit followed by a direction bit which in turn is followed by a special purpose bit. This initial sequence is in turn followed by an address field, and in appropriate instances (FIG. 3 and 4) a pause field and a second start bit. The message portion of the data packet includes a channel number followed by a data message which may vary in size depending upon the information transmitted. An error check and framing code terminate the data packet. While some of the packet units herein are described as bits, it is to be understood that these units may actually comprise multibit units. In addition, while a specific packet format is disclosed, it is to be understood that other format variations could be used without departing from the spirit and scope of the invention.

Figure 2:
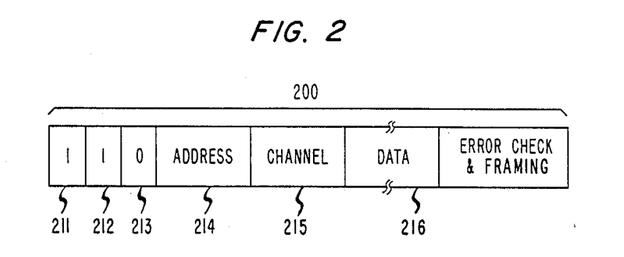
Figure 3:
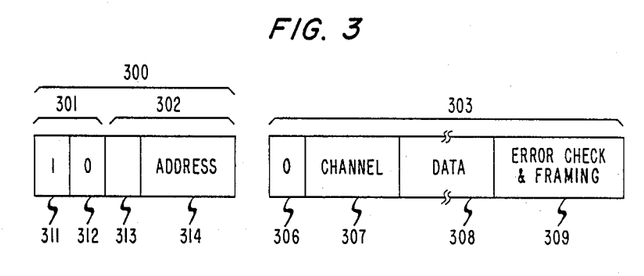
Figure 4:
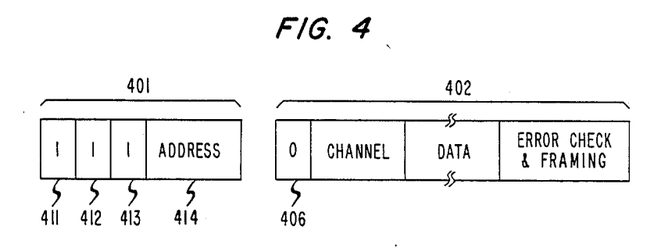

The packet 200 disclosed in FIG. 2 is intended to transmit data from the bus master control circuit 129 to a station 160 and its associated data processing device 120 connected to the bus 110. The entire packet 200 shown is supplied by the bus master control circuit 129 and the bus termination hub 130. FIG. 3 discloses the packet segments 300 and 303. These two packet segments accommodate circumstances in which data is sent from a data processing device 120 to the bus master control circuit 129. The initial portion 301 of the packet segment 300 (i.e. the start and direction bits 311 and 312) is supplied from the bus master control circuit 129. A subsequent special purpose or priority bit 313 and the address field 314 are supplied by contending stations in which a station with a priority address gains access to the bus. The particular station winning the contention process applies the subsequent packet segment 303 to the bus. This packet segment 303 includes a start bit 306, a channel number 307 and a message or data portion 308. The packet segment 401 of FIG. 4 is a control or polling packet with the header portion 401 supplied from the bus master control circuit 129 and with the packet segment 402 comprising a response from the station to which the header portion 401 was addressed.

The leading two bits of the packet 200 in FIG. 2 are the start bit 211 and the direction bit 212. These two bits both originate from the bus termination hub 130. The start bit 211, as indicated above, is utilized to synchronize the clocks of all the stations 160 connected to the bus 110 while the direction bit 212 indicates the direction of the following data flow on the bus. A 'one' direction bit 212, as shown in FIG. 2, indicates that data flow is from the bus master control circuit 129 to a data processing device 120 having the specified address 214. The 'zero' direction 312 bit shown in FIG. 3 indicates the following data flow is to be from a data processing device 120 to the bus master control circuit 129. A "one" direction bit 412 followed by a "one" special purpose or poll bit 413 as shown in FIG. 4 indicates that the packet segment 401 is concerned with obtaining status information in a response message 402 from an identified data processing device 160.

During the transmission of data from a bus master control circuit 129 to a data processing device 120, all the stations 160 on the bus respond to the direction bit 212 and are placed into a receiving mode of operation. Subsequently, each station 160 looks at the address portion 214 of the packet to see if it corresponds to its own individual address. The station 160 with the particular address defined in the packet clocks in the subsequent channel number 215 and the data 216. All the other stations ignore the message and wait for a data transmission interval defined by a subsequent start bit 211.

Contention of a station 160 to obtain access to the bus is initiated individually in response to each independent data processing device 120 having data to be sent. In the case of data flow to the bus master control circuit 129, a station 160 with information to send seeks access to the data distribution bus 110 in response to receipt of a start bit 311 and an appropriate direction bit 312 included in the packet segment 300 originated by the bus master control 129. Following the establishment of data direction flow, the individual stations each individually contend for access to the data transmission bus 110. A station 160 with a unique address is associated with each individual data processing device 120 coupled to bus 110. It applies its own unique address (i.e. priority code) to the bus bit by bit, and at the same time monitors the logic state of the bus 110 with an internal receiver unit. During this address or contention interval designated 314 in the packet, the bus is driven to a predetermined weak 'zero' logic state by bus master 129 that may be overridden by an applied logic 'one' state of any of the stations 160 connected thereto. Each bus interface unit 163 at each station 160 includes a tristate bus driver to drive the bus to desired logic states. A logic 'zero' is applied to the bus by setting the driver to its tristate state (i.e. putting its output as a high impedance state) thereby allowing the bus 110 to remain in the "weak" logic zero established by the bus master 129. A logic 'one' state is supplied by driving the bus 110 to a logic 'one' state. Each individual station 160 compares the logic status of the bus with the logic state it is currently applying to the bus. If the logic state of the bus is a 'one' while the logic state output of a particular station 160 is a 'zero', that particular station interface ceases to contend for access to the bus. When a particular station interface 160 has gained access to the data transmission bus (i.e. by outlasting all other contending stations), it transmits a special bit combination which is concluded with a second start bit 306 for synchronization included in the response 303 shown in FIG. 3. This start bit 306 is followed by channel number portion 307 and a message portion 308 of the data packet followed in by an error check and framing sequence 309.

During a polling interval, the identity of stations presently connected to the data transmission bus 110 is determined and certain maintenance functions are automatically performed. The data packet segment 401 disclosed in FIG. 4 includes a start bit 411, a direction bit 412 and a special polling bit 413 shown as having a logic "one" state to indicate that a polling procedure is to immediately follow. A subsequent address portion 414 is sent to identify a particular station 160. Each and every station is periodically and individually polled for its status. These stations each individually return a message portion 402 to the bus master control circuit 129 and bus termination hub 130 to indicate their current individual status, to indicate the type of data processing device 120 connected thereto, and to indicate a unique identification code. Each bus master 129 and station 160 have an indicator 179 and 180 associated with it as shown in FIG. 1. These indicators 179 and 180 may be a LED device, but are not so limited herein. Indicator 179 shows if the bus 110 connected to the bus master 129 is functioning and the indicator 180 shows if a particular station 160 is functional. Hence, a user or administrator may immediately identify a nonfunctioning portion of the system. Stations which are plugged into the bus and which are inactive or do not have power applied do not respond to the poll.

As discussed above, the bus termination hub 130 establishes the time intervals during which individual data processing stations may contend for access and apply data to the bus for transmission to the bus master control unit. The contention process involves comparing addresses or priority codes of the individual stations 160 in which each station applies its address to the bus bit by bit. (If only one station contends, it automatically wins.) Each station compares its present bit output with the logic state of the bus. The logic state of the bus is a logic one if any one station applies a logic "one" bit to it. Because signal transmission is not instantaneous, propagation delays along one bus must be taken into account. Hence, each individual station generates an address bit having a pulse duration at least equal to double the propagation delay time for the length of the transmission bus. This extended duration pulse may then be examined by every interface station along the data transmission bus during its own individual sampling window regardless of whether the pulse is generated by a station at the near or far end of the bus. A particular advantage of this aforedescribed contention arrangement is that the contention interval may be operated at a slow data rate to accommodate bus transmission time while each contending station applies its priority code and compares it bit by bit with the bus state, and the subsequent data transmission in response to the second start bit generated by the winning station may be transmitted at a faster data rate.

Figure 5:
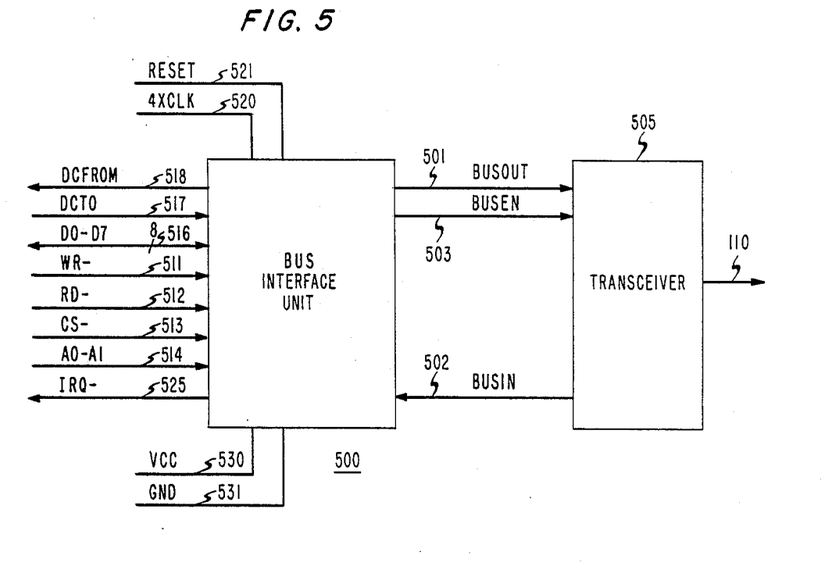
FIG. 5 is a single block showing a bus interface circuit's input and output leads.

A block diagram showing input and output leads of the bus interface portion of a typical intelligent connection or station is shown in FIG. 5. The block 500 of FIG. 5 may be embodied in a single integrated circuit chip although its internal functional components will be discussed as multiple function blocks herein below with reference to FIG. 6. This bus interface operates to send and receive data packets and perform contention functions. In receiving data packets it must recognize its address in the incoming data packet, acquire the data and then check for errors in the incoming data. In sending data it must participate in the contention process and transmit data with an error checking code included. Since stations may be readily connected to or disconnected from the bus through a passive plug arrangement, this bus interface includes installation processes to permit the ready addition of a new processing station to the bus. A further function of the bus interface is its periodic response to poll requests in order to fulfill administrative functions.

The bus interface unit 500 is connected to a transceiver 505 by the BUSOUT lead 501, the BUSIN lead 502 and the BUSEN enable lead 503. The transceiver 505 is in turn connected to the bus 110. The BUSIN lead 502 accepts incoming data from the transceiver 505 and the BUSOUT lead 501 transmits data to the transceiver 505. The BUSEN lead 503 enables the interface to drive the bus to desired logic states.

Leads 511 through 514 (WR, RD, CS, A0-A1) are input command leads to the bus interface unit. These commands are each defined by a particular combination of the logic state of the signals applied to each lead 511 through 514 at any particular time. Lead 516 (D0-D7) is a bidirectional data transmission bus connected to the data processing device. A ninth bit, associated with the data transmitted on lead 516 is transferred to the interface on the lead 517 (DCTO) and from the interface to the data processing device on lead 518 (DCFRO). Lead 520 accepts a local clock signal which is set in the illustrative embodiment at four times the data rate of the bus and lead 521 is a reset input applied at time startup. Each time that the interface transmits or receives a data packet it supplies an interrupt signal on lead 525 which is applied to the data processing station connected to the interface. Leads 530 and 531 are powering leads for accepting a DC voltage to energize the interface circuit.

Figure 6:
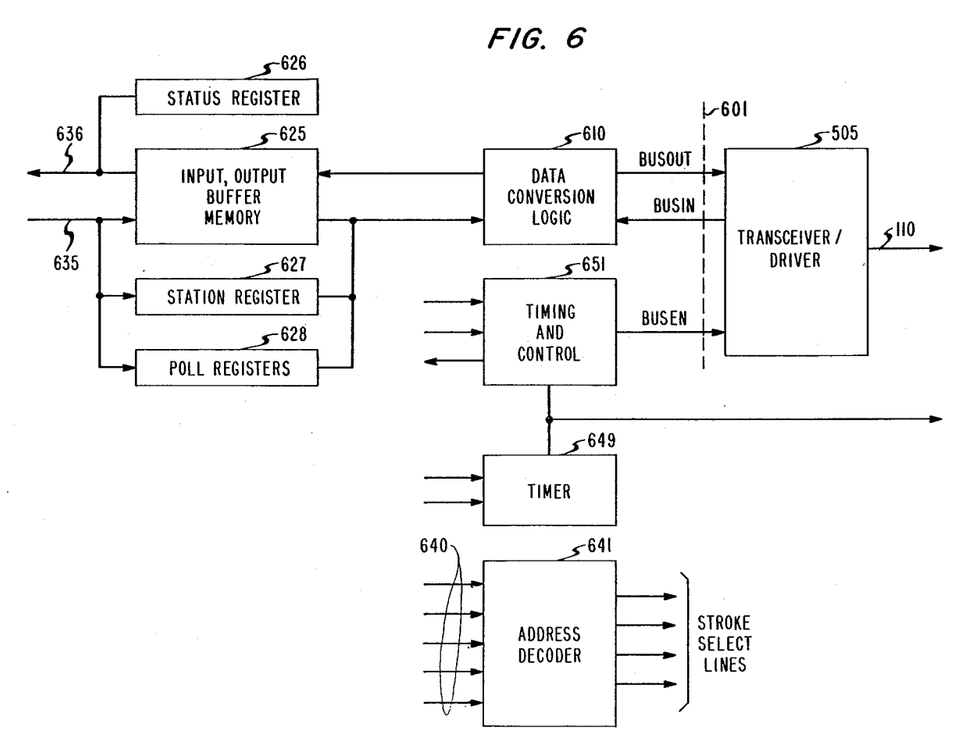
FIG. 6 shows a block diagram of the bus interface circuit circuit of FIG. 5.

A block diagram of the bus interface is shown in FIG. 6. Bus interface transceiver 505 is to the right of dotted line 601 and the bus interface logic circuitry is to its left. A data conversion logic circuit 610 is connected to transmit data to and receive data from the data distribution bus via the transceiver/driver 505. Data to and from the transceiver driver 505 is transmitted to and received from the bus in serial format and is converted from and to parallel format for the data processing device by the data conversion logic circuit 610. Incoming and outgoing data is temporarily stored in the input-/output buffer memory 625. The buffer memory 625 is a fifo type buffer memory and temporarily stores packets that are received or are about to be sent. This buffering storage is utilized to accommodate differing rates of data transmission of any data processing device and the transmission rate of the data distribution system. Associated with the memory 625 is a status register 626, a station register 627 and poll registers 628. The station register 627 contains the specific address information of this particular station. The poll registers 628 provide a poll response message to a poll request. Data to and from the data processing device is coupled via leads 635 and 636 to the memory 625, respectively.

Control signals are applied from a data processing device via leads 640 to the address decode circuit 641. The address decode circuit 641 generates control signals related to input signal combinations that are operative to strobe data into and out of the memory 625 and the registers 626, 627 and 628. The timer circuit 649 generates timing signals which the control circuit 651 utilizes to synchronously control gating circuits within the station interface and to enable the transceiver driver 505.

Figure 7:
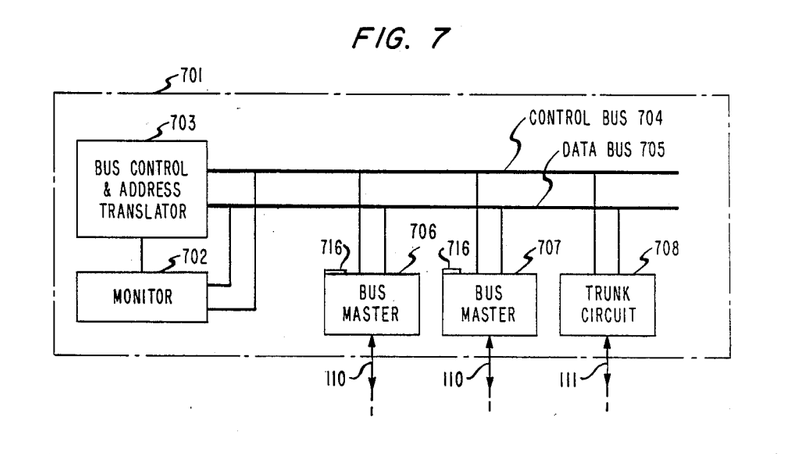
FIG. 7 is a block diagram of a bus termination hub and its assocated bus master control circuits.

A block diagram of the bus termination hub 701 and its included bus master control circuits 706 and 707 is shown in FIG. 7. The bus termination hub 701 includes a monitor unit 702 and an associated bus control and address translation circuit 703. The bus control and address translation circuit is connected to a control bus 704 and a data bus 705. Coupled to the control bus 704 and data bus 705 are the bus master control circuits 706 and 707 and a trunk circuit 708. The bus master control circuits 706 and 707 are each connected to local area data distribution busses 110 and the trunk circuit is connected to a distribution trunk 111. While only two bus master control circuits are shown, it is understood that a plurality of such circuits may be accommodated.

The bus termination hub 701 is operative through the monitor 702 as a maintenance control for the very local distribution system comprising the distribution busses 110 coupled to the bus termination hub 701.

The monitor 702 is a microcomputer programmed to perform the major control and maintenance functions related to the stations connected to the data distribution busses. It assists in detecting and isolating faulty stations. It operates through the bus control and address translation 703, and includes a dedicated processor which periodically polls the bus master control circuits 706, 707, etc. and through them the stations connected to the data distribution busses 110. The bus master control can be directed to poll any address on the bus 110 for its present status. Through polling the administrative function of determination of connecting and disconnecting stations from the bus can be monitored. The bus termination hub disables a bus master control, if one of the stations connected thereto is defective or operating improperly, and deactivates indicator 716 thus, identifying individual bus distribution systems that have failed and may require hardware maintenance. Thus, may administrative functions can be performed automatically. The bus control and address translation circuit 703 operates as a local virtual circuit packet switch providing the packet switching function to control data transmission between busses, trunks and stations.

In a data transfer operation each bus master control is polled via control bus 704 in round robin fashion to see if it has data previously received from bus 110 in its buffer. If such data exists, the station and channel addresses are gated onto the bus 705, and are transmitted to the address translation unit of 703. The address translation circuitry uses a look-up table to locate the appropriate destination address of the packet and the bus control gates it to the data transmission bus 705. If the destination bus master control or trunk circuit has sufficient room in its buffer to accommodate the packet, it so indicates via the control bus. The destination aodress and associated data can then be transferred over the data bus to the destination. If the destination does not have room in its buffer, no transfer takes place. The data remains in the source bus master control's buffer and may be transferred during a subsequent data transfer cycle.

Since all data is buffered in the bus master 706 and trunk circuit 701, the data transmission busses 110 and trunk lines may all operate at different data transmission rates. This advantageously permits combining of bus systems of differing data rates into one combined local area network.

Data to be sent to or received from a central switch such as the central virtual circuit switch in FIG. 1 is handled through the trunk circuit control 708 which is coupled to a trunk line 111. Its operation is similar to that of the bus master control and is not discussed in detail.

Figure 8:
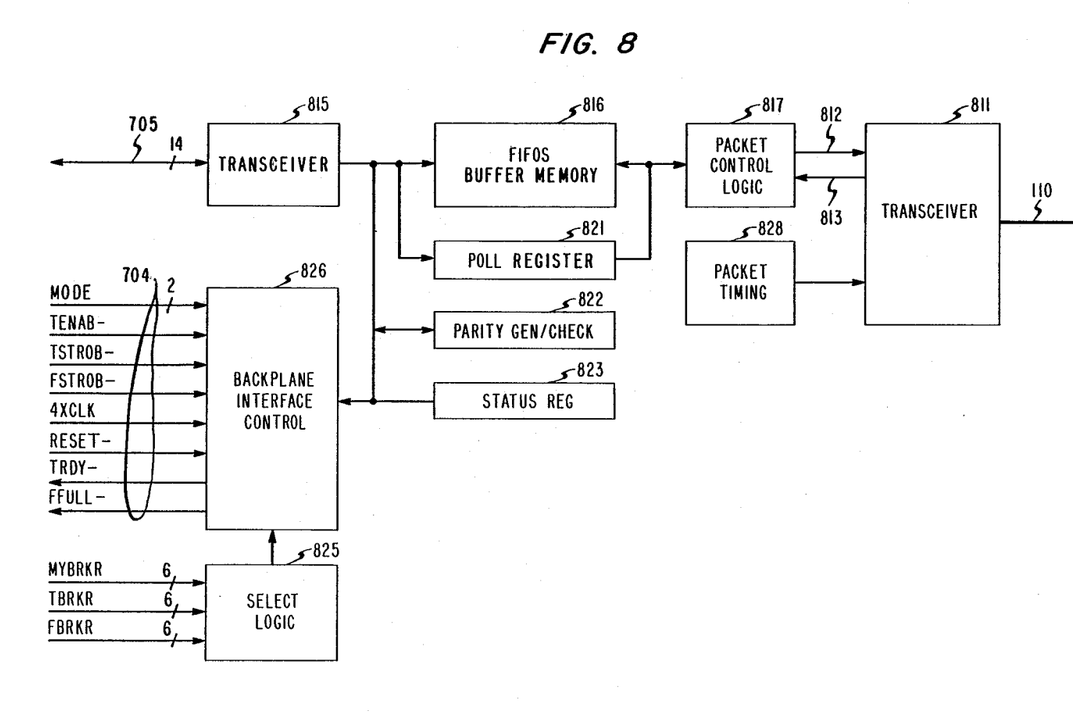
FIG. 8 is a block diagram of a bus master control circuit.

A block diagram of a bus master control circuit is shown in FIG. 8 connected to a local data transmission bus 110 through a transceiver/driver circuit 811 which provides the necessary electrical level interfacing between the bus master control circuit and the bus including driving the bus to a predetermined logic state during contention between stations. The bus master control circuit is coupled to data bus 705 by transceiver circuit 815. The transceiver circuit 815 is coupled to a fifo buffer memory 816 which is also coupled to transmit and receive data from the packet control logic 817. The packet control logic 817 is coupled to transmit data to transceiver 811 via lead 812 and receive data from transceiver 811 via lead 813. The packet control logic 817 is operative to provide serial/parallel conversion of the packets and formulating of packet types including adding appropriate error codes and providing synchronization, and directing polling and framing signals to be added to individual packets.

Associated with the memory 816 are a poll register 821, a parity generator checker 822 and a status register 823. The poll register holds the address identifying the station to be polled during the next polling interval. It is loaded by the monitor via the data bus 705 and control bus 704. The response to the poll is held in memory 816 prior to being transferred to the monitor over data bus 705 in a manner identical to data packet transfers. Parity is specified for outgoing data and checked for incoming data by circuit 822 and the status register 823 supplies status indicator signals which the monitor circuit 702 shown in FIG. 7 is able to read.

A select logic circuit 825 is coupled to perceive a hardwired address included in plug in slots coupling the bus master circuit to the bus 705. The address is used in sequentially selecting bus master circuits for connection to the bus control and address translator included in the bus termination hub 701. The backplane interface control 826 responds to control signals supplied by the bus control to control the operation of the bus master control circuit.

A packet timing circuit 828 is also included for enabling the synchronizing of the operation of the transceiver 811 with incoming and outgoing packets. The packet timing circuit 828 generates timing signals which the packet control logic circuit 817 utilizes to synchronously control gating circuits within the bus master control circuit and to enable the transceiver 811 driver.

What is claimed is:

1. A local area data distribution system for packet formatted data flow comprising:
    a bidirectional data transmission bus,
    first and second stations connected to the bidirectional data transmission bus, each station including; means for transmitting and receiving data, data storage means for accommodating differing input and output data rates, a unique address and connecting means for accepting a data processing device and means for resolving a conflict in the first and second stations simultaneous attempting to access the bidirectional data transmission bus to apply data thereto;
    a bus termination hub, including; a bus master control connected to the data transmission bus, a data trunk for facilitating a data transmission connection to external data handling entities, local virtual circuit switching means, and bus monitoring means for monitoring an operational status of the bidirectional data transmission bus and the first and second station connected thereto;
    the bus master control including data drive and receive means and data buffering means for accommodating differing input and output data rates
    the local virtual circuit switching means being operative for controlling data flow between the first and second station and between one or first and second stations and an external data hanling entity.

2. A local area data distribution system as defined in claim 1 wherein
    the bus termination hub further includes a second bus master control having data drive and receive means and data buffering means for accommodating differing input and output data rates,
    a second data transmission bus connected to the second bus master control,
    third and fourth stations connected to the second data transmission bus and each station including means for transmitting and receiving data, data storage means for accommodating differing input and output data rates, a unique address and input means for accepting a data processing device,
    the local virtual circuit switching means being further operative for controlling data flow between the third and fourth stations, between one of the third and fourth stations and the external data handling entity, and between the first and second data transmission busses.

3. A local area data distribution system as defined in claim 2 and wherein
    the bus termination hub further includes a trunk connecting circuit including an output connection and data retention means for accoodating differing input and output data rates,
    a trunk for data transmission connected to the output connection,
    the external data handling entity including a central virtual circuit switch node connected to the trunk,
    the local virtual switching means being further operative for controlling data flow between the data transmission busses and their associated stations and the central virtual circuit switch node.

4. A local area data distribution system as defined in claim 3 and further including
    a second bus termination hub connected to a plurality of additional data transmission busses, and
    the central virtual circuit switch node being operative for controlling data flow between the first and second bus termination hubs.

5. A local data distribution system as defined in claim 1 or 4 wherein the bus master control includes means for polling stations coupled to the data distribution bus, and
    data packet control circuitry for controlling data packets applied to the data transmission bus.

6. A local data distribution system as defined in claim 1 or 4 wherein the bus monitoring means includes means for polling a status of each station connected to the data transmission bus.

7. A local area data distribution system as defined in claim 1 or 4 wherein data flow is in packet format.

8. A local area data distribution system as defined in claim 1 or 4 wherein the local virtual circuit switching means includes address translation circuitry.

9. A local area data distribution system as defined in claim 8 wherein each packet includes a first bit for providing synchronization between the bus master control and the connecting station and a second bit for specifying direction of data flow between a bus master control means and a connecting station.

10. A local area data distribution system as defined in claim 1 or 4 wherein the bus monitoring means is operative for disconnecting and identifying a faulty bidirectional data transmission bus or one having a faulty station connected to it.

11. A local area data distribution system, comprising
a central virtual circuit switch connected as a central node to a plurality of data distribution systems each joined independently to the virtual circuit switch in a star network configuration,
at least one of the data distribution systems comprising;
a bidirectional data transmission bus,
a means for controlling data flow connected to the data transmission bus and to the central virtual circuit switch and including local virtual circuit switching means for controlling local data traffic flow to and from addressable entities attached to the bidirectional data transmission bus, and
the addressable entities including station units each having a unique destination address and operative for coupling data processing devices to the bidirectional data transmission bus and further including means for resolving conflict in more than one station unit simultaneously attempting to access the bidirectional data transmission bus to apply data thereto;

12. A local area data distribution system as defined in claim 11 wherein;
the means for controlling data flow includes
means for monitoring a status of stations connected to the bidirectional data transmission bus.

13. A local area data distribution system as defined in claim 11 wherein;
data flow is in a form of data packets
each data packet including synchronizing information, directional information and address information, and the local virtual circuit switching means includes means for translating and converting source address information into a specific destination address.

14. A local area data distribution system as defined in claim 11 wherein;
the means for controlling data flow includes first data buffering means and
the station units each include second data buffering means.

15. A local area data distribution system as defined in claim 11 wherein;
the means for controlling data flow includes means for sequentially polling stations connected to a data transmission bus.

16. A digital data communication system comprising;
a plurality of bidirectional communication busses each providing two-way switched packet data communication between a plurality of data processing devices connected thereto,
each said data processing device including means for resolving conflicts between more than one of said devices attempting to access the connected bus at the same time,
means for connecting subsets of said busses to a communications hub for providing virtual circuit communication between the different ones of each said subset of busses connected to said hub, and
means, including a virtual circuit switch, for connecting all of said hubs to each other and to other data communications systems.

17. The digital data communication system according to claim 16 further comprising;
centralized maintenance means in each of said hubs for polling each of said data processing devices connected to communication busses connected to the said hub, and
means responsive to said polling means for identifying ones of said devices requiring maintenance.

18. A local area data distribution system, comprising:
a bidirectional data transmission bus,
first and second stations connected to the bidirectional data transmission bus, each station including; means for transmitting and receiving data, data storage means for accommodating differing input and output data rates, a unique address and connecting means for accepting a data processing device;
a bus termination hub, including; a bus master control connected to the data transmission bus, a data trunk for facilitating a data transmission connection to external data handling entities, local virtual circuit switching means, and bus monitoring means for monitoring an operational status of the bidirectional data transmission bus and the first and second station connected thereto and including means for polling a status of each station connected to the data transmission bus;
the bus master control including data drive and receive means and data buffering means for accommodating differing input and output data rates,
the local virtual circuit switching means being operative for controlling data flow between the first and second station and between the first and second stations and an external data handling entity.

19. A local area data distribution system, comprising:
a first bidirectional data transmission bus,
a second bidirectional data transmission bus,
a third bidirectional data transmission bus,
first and second stations connected to the first bidirectional data transmission bus, third and fourth stations connected to the second bidirectional data transmission bus, fifth and sixth stations connected to the third bidirectional data transmission bus, each station including; means for transmitting and receiving data, data storage means for accommodating differing input and output data rates, a unique address and connecting means for accepting a data processing device;
a first bus termination hub, including;
a first bus master control connected to the first bidirectional data transmission bus, a second bus master control connected to the second bidirectional data transmission bus, a first data trunk for facilitating a data transmission connection to external data handling entities, first local virtual circuit switching means, and bus monitoring means for monitoring an operational status of the first and second bidirectional data transmission busses and monitoring by polling the first, second, third and fourth stations connected thereto, a first trunk connecting circuit including a first output connection and data retention means for accommodating differing input and output data rates;

a second bus termination hub, including;

a third bus master control connected to the third bidirectional data transmission bus, a second data trunk for facilitating a data transmission connection to external data handling entitites, second local virtual circuit means, and bus monitoring measns for monitoring an operational status of the third bidirectional data transmission bus and monitoring by polling the fifth and sixth stations connected thereto, a second trunk connecting circuit including a second output connection and data retention means for accommodating differing input and output data rates;

the first and second bus master controls each including data drive and receive means and data buffering means for accommodating differing input and output data rates, the first local virtual circuit switching means being operative for controlling data flow between one of the first, second third and fourth stations the first and second bidirectional data transmission busses and an external data handling entity, and the second local virtual circuit switching means being operative for controlling data flow between one of the fifth and sixth stations and the external data handling entity;

the external data handling entity including a central virtual circuit switch node connected to the first and sercond trunks and operative for controlling data flow between the first and second bus termination hubs.

20. A local area data distribution system wherein data flow is in packet format, comprising:

a bidirectional data transmission bus, first and second stations connected to the bidirectional data transmission bus, each station including; means for transmitting and receiving data, data storage means for accommodating differing input and output data rates, a unique address and connecting means for acepting a data processing device;

a bus termination hub, including; a bus master control connected to the data transmission bus, a data trunk for facilitating a data transmission connection to external data handling entities, local virtual circuit switching means and bus monitoring means for monitoring an operational status of the bidirectional data transmission bus and the first and second station connected thereto;

the bus master control including data drive and receive means and data buffering means for acommodating differing input and output data rates, the local virtual circuit switching means being operative for controlling data flow between the first and second station and between the first and second stations and an external data handling entity, and each data packet including a first bit for providing synchronization between the bus master control and a connecting station and a second bit for specifying direction of data flow between a bus master and a connecting station.

21. A local area data distribution system for transmitting data flow in a packet format, comprising a first bidirectional data transmission bus, a second bidirectional data transmission bus, a third bidirectional data transmission bus, first and sseocnd stations connected to the first bidirectional data transmission bus, third and fourth stations connected to the second bidirectional data transmission bus, fifth and sixth stations connected to the third bidirectional data transmission bus, each station including; means for transmitting and receiving data, data storage means for accommodating differing input and output data rates, a unique address and connecting means for acepting a data processing device;

a first bus termination hub, including;

a first bus master control connected to the first bidirectional data transmission bus, a second bus master control connected to the second bidirectional data transmission bus, a first data trunk for facilitating a data transmission connection to external data handling entities, first local virtual sitching means including address translation circuitry, and bus monitoring means for monitoring an operational status of the first and second bidirectional data transmission busses and the first, second, third and fourth, stations connected thereto, a first trunk connecting circuit including a first output connection and data retention means for accommodating differing input and output data rates;

a second bus termination hub, including;

a third bus master control connected to the third bidirectional data transmission bus, a second data trunk for facilitating a data transmission connection to externl data handling entities, second local virtual circuit switching means including address translation circuitry, and bus monitoring means for monitoring an operational status of the third bidirectional data transmission bus and the fifth and sixth stations connected thereto, a second trunk connecting circuit including a second output connection and data retention lmeans for accomodating differing input and output data rates;

the first and second bus master controls each including data drive and receive means and data buffering means for accommodating differing input and output data rates, the first local virtual circuit switching means being operative for controlling data flow between one of the first, second, third and fourth stations the first and second bidirectional data transmission busses and an external data handling entity, and the second local virtual circuit switching means being operative for controlling data flow between one of the fifth and sixth stations and the external data handling entity;

the external data handling entity including a central virtual circuit switch node connected to the first and second trunks and operative for controlling data flow between the first and second bus termination hubs;

whereby each packet includes a first bit for providing synchronization between the bus master control and a connecting station and a second bit for specifying direction of data flow between a bus master control means and a connecting station.

22. A local area data distribution system, comprising:

a bidirectional data transmission bus, first and second stations connected to the bidirectional data transmission bus, each station including; means for transmitting and receiving data, data storage means for accommodating differing input and output data rates, a unique address and connecting means for accepting a data processing device;

a bus termination hub, including; a bus master control connected to the data transmission bus, a data trunk for facilitating a data transmission connection to external data handling entities, local virtual circuit switching means and bus monitoring means for monitoring a operational status of the bidirectional data transmission bus and the first and second station connected thereto and operative for disconnecting and identifying a faulty bidirectional data transmission bus or one having a faulty station connected to it;

the bus master control including data drive and receive means and data buffering means for accommodating differing input and output data rates, the local virtual circuit switching means being operative for controlling data flow between the first and second station and between the first and second stations and an external data handling entity.

23. A local area ata distribution system, comprising:
a first bidirectional data transmission bus,
a second bidirectional ata transmission bus,
a third bidirectional data transmission bus,
first and second staitons connected to the first bidirectional data transmission bus, third and fourth stations connected to the second bidirectional data transmission bus, fifth and sixth stations connected to the third bidirectional data transmission bus, each station including; means for transmitting and receiving data, data storage means for accommodating differing inlput and output data rates; a unique address and connecting means for accepting a data processing device;

a first bus termination hub, including;
a first bus master control connected to the first bidirectional data transmission bus, a second bus master control connected to the second bidirectional data transmission bus, a first data trunk for facilitating a data transmission connection to external data handling entities, first local virtual circuit switching mesans, and bus monitoring means for monitoring an operational status of the first and second bidirectional data transmission busses and the first, second, third and fourth, stations connected thereto and further being operative for disconnecting and identifying a faulty bidirectional data transmission bus or one having a faulty station connected to it, a first trunk connecting circuit including a first output connection and data retention means for accommodating differing input and output data rates;

a second bus termination hub, including;
a third bus master control connected to the third bidirectional data transmission bus, a second data trunk for facilitating a data tansmission connection to external data handling entities, secon local virtual circuit switching means, and bus monitoring means for monitoring an operational status of the third bidirectional data transmission bus and the fifth and sixth stations connected thereto and further being operative for disconnecting and identifying a faulty bidirectional data transmission bus or one having a faulty station connected to it, a second trunk connecting circuit including a second output connection and data retention means for accommodating differing input and output data rates;

a trunk for data transmission connected to the first and second output connections;

the first and second bus master controls each including data drive and receive means and data buffering means for accommodating differing input and output data rates, the first local virtual circuit switching means being opetive for controlling data flow between one of the first, second, third and fourth stations that first and second bidirectional data transmission busses and an external data handling entity, and the second local virtual circuit switching means being operative for controlling data flow between one of the fifth an sixth stations and the external ata handling entity;

the external data handling entity including a central virtual circuit switch node connected to the first and second trunks and operative for controlling data flow between the first and second bus termination hubs.

24. A local area data distribution system wherein data flow is in a form of data packets, comprising:
a data packet format in which each data packet includes synchronizing information, directional information and address information,
a central virtual circuit switch connected as a central node to a plurality of data distribution systems each joined independently to the virtual circuit switch in a star network configuration,
at least one of the data distribution systems comprising;
a bidirectional data transmission bus,
a means for controlling data flow connected to the data transmission bus and to the central virutal circuit switch and including local virtual circuit switching measns for controlling local data traffic flow to and from addressable entities attached to the bidirectional data transmission bus and including means for translating and converting source address information into a specific destination address, and
the addressable entities including station units each having a unique destination address and operative for coupling data processing devices to the bidirectional data bus.

25. A system for local distribution of data packets, comprising:
a bidirectional data transmission bus including a plurality of passive data outlets.
at least a first and second data station connected to first and second ones of the passive data outlets, each data station having a unique address, and input means for accepting a data processing device,
a data trunk for connecting to an external data handling entity,
a bus termination hub connect®d for interconnecting the ata trunk and the bidirectional data transmission bus and including a bus master control an local virtual circuit switch for switching data between the data trunk and the bus master control,
the bus master control including a data driver, a data receiver, and data buffering apparatus for accommodating differing data rates between the data trunk and the bidirectional data transmission bus and a means for applying synchronization signals to the bidirectional data transmission bus, and means for polling a status of stations connected to the bidirectional data transmission the first and second stations each including a data driver, a data receiver and data buffering apparatus for accommodating differing data rates between the data processing device and the bidirectional data transmission bus; synchronization signal response means and means for determining if the bidirectional data transmission bus is in a mode transmitting data to station or in a mode receiving data from stations.

26. A system for local distribution of data packets as defined in claim 25 wherein ech of the first and second stations includes contention resolution means responsive to a synchronization signal from the bus master control to determine which ones of simultaneously competing stations may apply data to the bidirectional data transmission bus.

27. A system for local distribution of data packets as defined in claim 26 wherein address bits applied to the bidirectional data transmission bus are longer in duration than data bits included in the packet.

* * * * *